O. E. JOSEPH.
ROAD INDICATOR.
APPLICATION FILED JUNE 14, 1915.

1,191,316.

Patented July 18, 1916.
3 SHEETS—SHEET 1.

WITNESSES.

INVENTOR
O. E. JOSEPH.

BY Fetherstonhaugh & Co.
ATTYS.

O. E. JOSEPH.
ROAD INDICATOR.
APPLICATION FILED JUNE 14, 1915.
1,191,316.
Patented July 18, 1916.
3 SHEETS—SHEET 2.
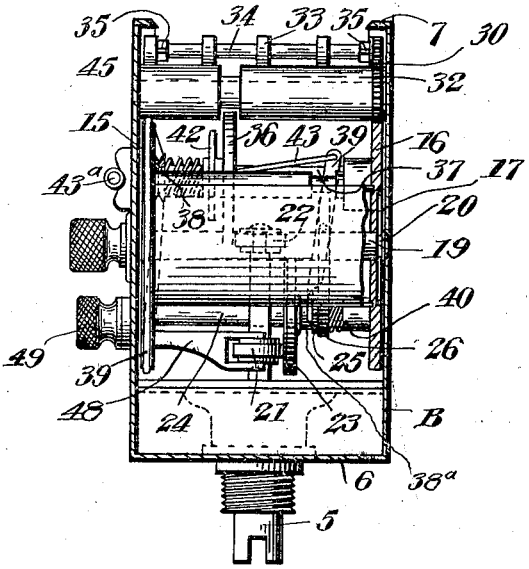
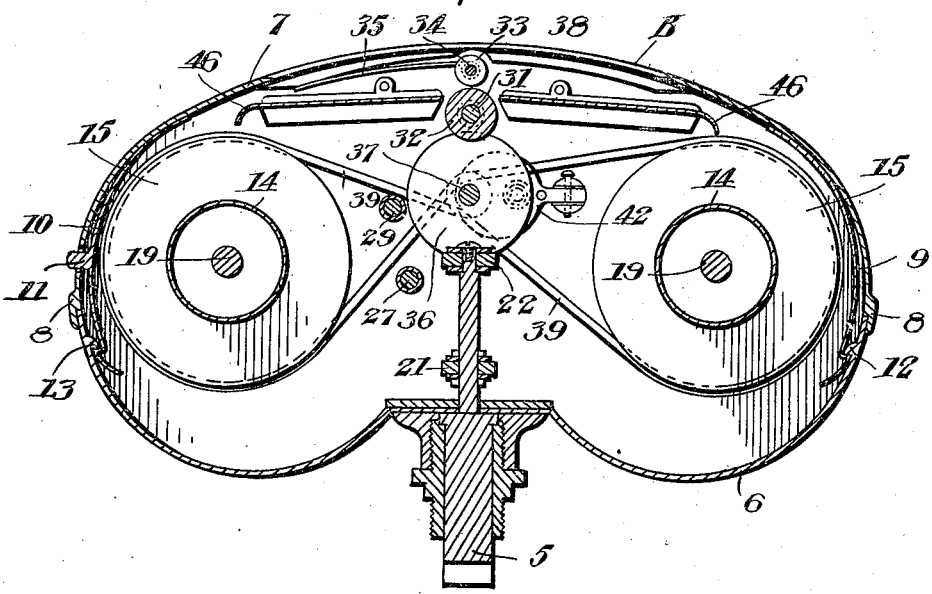
WITNESSES
INVENTOR
O. E. JOSEPH.
BY Fetherstonhaugh & Co.
ATT'YS.

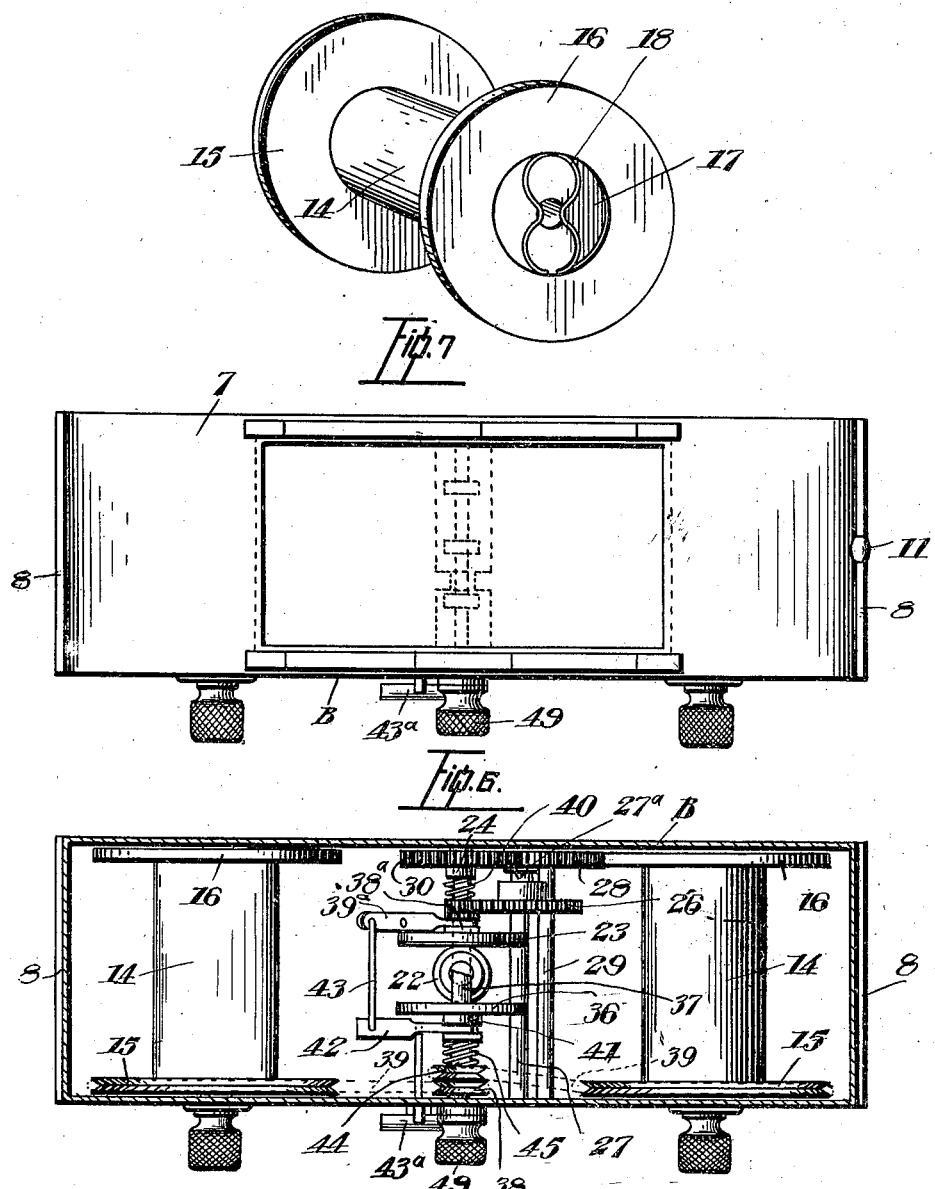

UNITED STATES PATENT OFFICE.

ORVILLE EARNEST JOSEPH, OF CHICAGO, ILLINOIS.

ROAD-INDICATOR.

1,191,316. Specification of Letters Patent. Patented July 18, 1916.

Application filed June 14, 1915. Serial No. 34,036.

*To all whom it may concern:*

Be it known that I, ORVILLE EARNEST JOSEPH, a subject of the King of Great Britain, and resident of Chicago, in the State of Illinois, United States, have invented certain new and useful Improvements in Road-Indicators, of which the following is the specification.

This invention relates to improvements in road indicators and the objects of the invention are to aid the driver of vehicles traveling over unfamiliar roads to bring to the notice of the traveler information in the nature of advertising, points of interest, local laws and restrictions and in fact all information of interest or value to motorists in transit.

Further objects are to render the indicator capable of being reversed, to simplify the mechanism and reduce the number of working parts and generally to adapt the indicator to better perform the functions required of it, and it consists essentially of the improved construction particularly described and set forth in the following specification and accompanying drawings forming part of the same.

Figure 1:
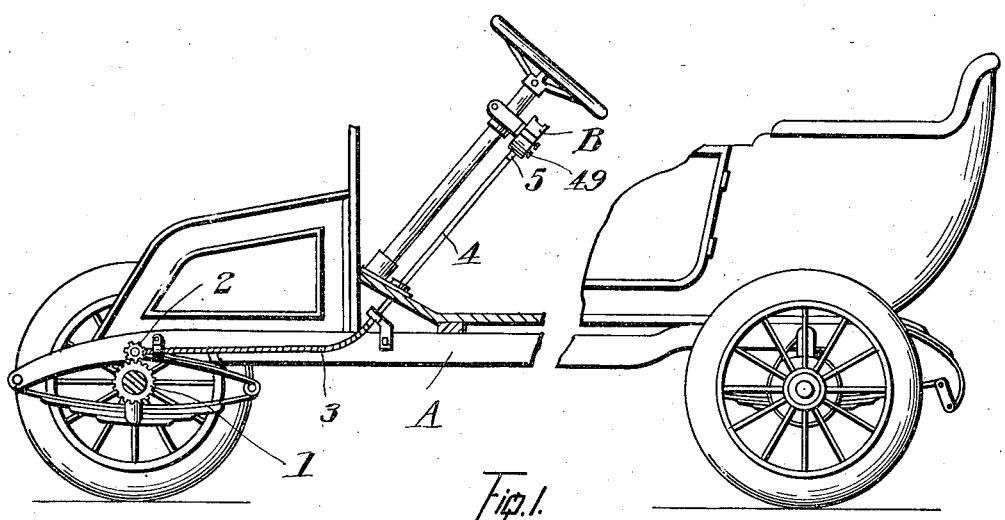
Figure 2:
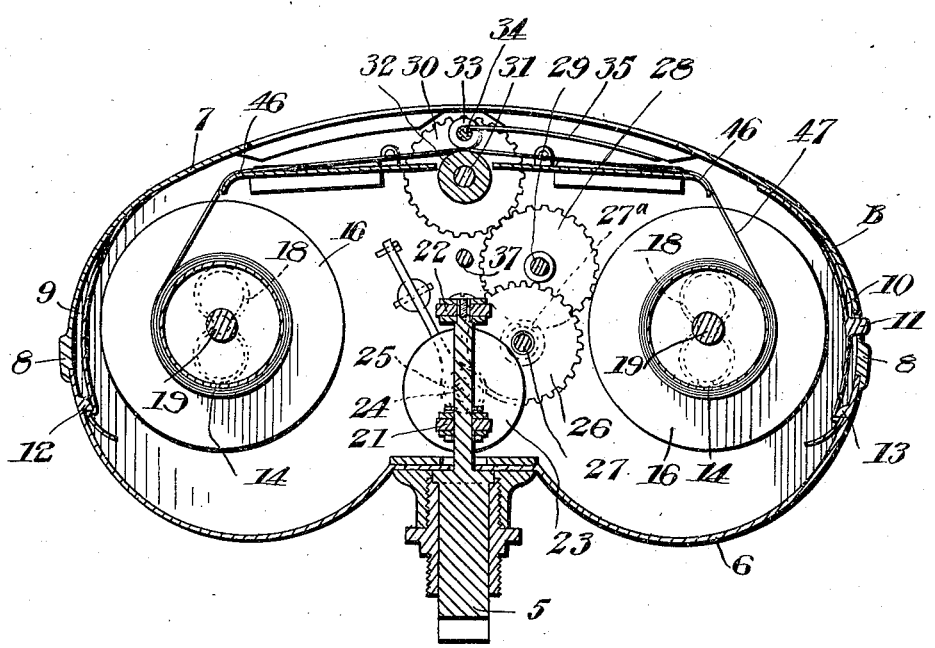

In the drawings, Figure 1 is a side elevation of an automobile, broken away, showing the improved indicator mounted thereon. Fig. 2 is a longitudinal section of the indicator, looking from the front thereof. Fig. 3 is a longitudinal section of the indicator, looking from the back thereof. Fig. 4 is a transverse section of the improved indicator. Fig. 5 is a plan view of the indicator with the casing in section. Fig. 6 is a plan view of the improved indicator. Fig. 7 is a perspective view of one of the interchangeable rollers mounted in the casing.

Like characters of reference refer to like parts in the several drawings.

Referring to the drawings, A represents an automobile of any usual construction and B the improved indicator mounted thereon. Mounted on one of the front wheels of the automobile is a pinion wheel 1 designed to mesh with the pinion wheel 2 operatively connected through the medium of the flexible drive 3 to the angularly disposed spindle 4 which in turn engages at its upper end with the stub spindle 5 adapted to transmit the necessary motion to the gearing carried by the indicator.

The indicator B comprises a casing 6 preferably made with a removable cover 7 provided on its lateral faces with flanges 8 designed to engage the lower part of the casing and provided with resilient latches 9 and 10, the latter of which carries a projection 11 extending through the cover and by means of which the said latch is capable of being manually operated. The lower part of the casing carries on diametrically opposite sides integral projections 12 and 13 designed to engage with the resilient latches 9 and 10 when the cover is in a closed position on the casing. Rotatably mounted in the casing are a pair of interchangeable rollers 14 constructed with flanges 15 and 16, the former of which is grooved thereby facilitating in transmitting rotary motion to the rollers, the latter being provided with a concentrically located recess 17 adapted to house the spring 18 which is preferably made in the form of an 8, the object of which will be made clear hereafter. These rollers are mounted on spindles 19 extending transversely across the casing, the inner end of the spindles being preferably formed with a groove 20 adapted to engage the resilient member 18 thereby securely locking the spindle in engagement therewith and preventing its becoming inadvertently disengaged from the rollers, due to vibration or jarring.

Located intermediate of the rollers 14 is the stub spindle 5, the upper end of which is reduced and preferably formed square and is adapted to carry an adjustably mounted roller 21 while the upper end of the spindle is also provided with a roller 22 rigidly mounted thereon. The roller 21 is adapted to make contact with the friction disk 23 rotatably mounted on the spindle 24 which is further provided with a pinion wheel 25 adapted to mesh with the pinion wheel 26 carried by the spindle 27 which in turn is further provided with a pinion wheel 27$^a$ meshing with the pinion wheel 28 carried by the spindle 29 thereby transmitting motion to the pinion wheel 30 mounted on the spindle 31. The spindle 31 is further provided with a roller 32 adapted to engage with the superimposed idle roller 33 rotatably mounted on the spindle 34, the said rollers being held in frictional contact by the leaf spring 35 carried by the casing. The roller 22 is adapted to engage with the friction disk 36 rotatably mounted on the spindle 37 which carries grooved pulleys 38 around which the belts 39 engaging with the recessed flange 15 of the rollers 14 take.

It is desirable that the friction disk 23 should be capable of being disengaged from the roller 21 and to do this I preferably provide the friction disk with a boss 38$^a$ having a recess therein adapted to engage the bifurcated end of the lever 39$^a$ which is pivotally mounted in the casing intermediate of its length. The contact of the friction disk 23 with the roller 21 is controlled by the resilient spring 40 mounted on the spindle 24 and located between the casing 6 and the outer face of the boss 38$^a$ of the friction disk. Simultaneous with this adjusting of the friction disk 23, the friction disk 36 is also adapted to be disengaged from the roller 22, the friction disk 36 being also provided with a boss 41 having a groove therein designed to engage with the lever 42 which is connected at its outer end by means of the link 43 with the lever 39$^a$, thereby permitting of the said levers being simultaneously actuated through the medium of the thumb screw 43$^a$ threaded on the spindle 44, the inner end of which engages the lever 42. The disk 36 is adapted to be held in engagement with the roller 22 by means of a spiral spring 45 mounted on the spindle 37 and located between the casing and the face of the boss 41, the said spring intimately holding the friction disk 36 in engagement with the roller thereby eliminating slip, due to vibration or jarring.

The casing 6 also carries guide plates 46 located adjacent to the cover 7 and adapted to support the tape 47 taking around the rollers 14. In assembling the device the tape 47 is placed on the rollers 14 which are then inserted in the casing and the spindles 19 passed therethrough to engage at their inner ends with the resilient clip 18 housed in the flange 16 of the rollers, the said tape engaging intermediate of the rollers with the roller 32 and idler 33. When the journey is commenced, motion from the front wheel of the automobile is transmitted through the medium of the pinion wheel 1 and the pinion 2 to the flexible drive 3 thereby rotating the spindle 4 which in turn transmits rotary motion to the stub spindle 5 carried by the casing. This motion of the stub spindle 5 is transmitted through the adjustable roller 21 to the friction disk 23 and thence through the pinion 25 to the intermeshing pinion 26 which rotates the spindle 27, the motion being transmitted through the medium of the pinion wheel 28 to the pinion wheel 29 thereby rotating the pinion wheel 30 and the roller 32. Simultaneously with this operation the roller 22 engages with the friction disk 36 rotating the spindle 37 and the grooved pulleys mounted thereon and transmitting motion through the medium of the belts 39 to the rollers 14. When the journey is completed and it is desirable that the motion of the indicator should be reversed, it is only necessary to elevate the roller 21 so that it engages the friction disk 23 on that side diametrically opposite where the first contact was made, and to facilitate in this operation I provide a slidably mounted bracket 48 having a bifurcated inner end adapted to embrace the roller, the outer end being provided with a thumb screw 49 by means of which the bracket 48 is held in the desired position.

It will be understood that by providing a positive drive to the roller 32 and simultaneously with the friction disk 36 that all slip of the tape in the operation of the indicator is eliminated.

The belts 39 which drive the two reels take up the slack of the tape after it has passed over the roller 32 at the top. There is no slip between the friction disks and the friction wheels, but there is a slip of the belts on the small grooved wheels carried by the spindle 37. These wheels being so very much smaller than the flanges of the reels, permit this slip to take place, also the point of contact of the disks on the friction wheel is at a much greater radius than the diameter of the small grooved wheels. By utilizing this type of drive there is about a one ounce pull on the tape so that the said tape is always in a state of tension which is capable of being adjusted through the medium of the belts. These belts are so arranged, one running straight and the other across, as to hold the tension on the tape regardless of which direction the tape is traveling, and with the two belts at the same tension one will assist as much as the other will retard. This tension also causes the tape to run straight from one reel to another. The drive roller 32 causes the tape to travel and is reversible according to the actuation of the rollers engaging with the friction disks.

When the device is used to record a road between two predetermined points the several turns and branch roads together with the other physical irregularities, places of interest, by-laws of the district and advertising mediums are noted on the tape 47 which is capable of being viewed through the orifice in the cover 7 so that as the several turns or other information is displayed the traveler is made acquainted with the several points of interest. It will also be clear that by rendering the roller 22 capable of being adjusted to engage on diametrically opposite sides of the disk 23 that a graduation of motion can be transmitted to the roller 32 thereby eliminating slip in the tape 47 which is kept in the desired state of tension. The belts 39 can be twisted at the option of the operator so that the motion given to the roller 14 is also capable of being reversed.

What I claim as my invention is:

1. An indicator of the class described comprising a casing, interchangeable rollers mounted therein, a roller rotatably mounted intermediate of the said interchangeable rollers, a tape taking around the interchangeable rollers and engaging with the second said roller, a friction disk operatively connected to the second said roller, a stub spindle, a roller adjustably mounted on the stub spindle adapted to engage with the disk, and means for adjusting the roller to alter the direction of motion of the disk.

2. An indicator of the class described comprising a casing, interchangeable rollers mounted therein provided with flanges, a stub spindle rotatably mounted in the casing provided with a roller rigidly mounted on the upper end thereof, a friction disk rotatably mounted in the casing and adapted to engage the said roller, grooved pulleys operatively connected to the friction disk, belts taking around the grooved pulleys and flanges of the rollers, and means for rotating the stub spindle.

3. In an indicator of the class described and in combination, a casing, interchangeable rollers mounted therein, a roller located intermediate of the interchangeable rollers, a spindle having a reduced upper end substantially square in cross section, a roller adjustably mounted on the reduced end of the spindle, a friction disk coacting with the roller and operatively connected to the roller located intermediate of the interchangeable rollers, and means for adjusting the roller on the spindle to give a graduated motion to the roller located intermediate of the interchangeable rollers.

4. In an indicator of the class described and in combination, interchangeable rollers, a tape taking therearound, a pair of power operated friction disks rotatably mounted in the casing, rollers coacting with the friction disks, tape winding and unwinding means operated by said rollers, and means for simultaneously disengaging the friction disks and the rollers whereby movement of the tape is stopped.

5. In an indicator of the class described and in combination, a casing, interchangeable rollers rotatably mounted therein, a tape taking around the interchangeable rollers, a pair of power operated friction disks rotatably mounted in the casing, rollers coacting with the friction disks, tape winding and unwinding means operated by said rollers, resilient means for holding the rollers and friction disks in contact, and means for simultaneously disengaging the rollers and friction disks whereby movement of the tape is stopped.

6. In an indicator of the class described and in combination, interchangeable rollers provided with concentric recesses in one side thereof, resilient clips of substantially S-shape mounted in the recesses, spindles engaging the rollers and provided with recesses in the end thereof adapted to engage the resilient clips, a tape taking around the interchangeable rollers and means for rotating the rollers.

7. In an indicator of the class described and in combination, a casing, interchangeable rollers rotatably mounted therein, a roller intermediate of the interchangeable rollers, a tape taking around the interchangeable rollers and engaging the second roller, friction disks rotatably mounted in the casing, rollers coacting with the friction disks, levers operatively connected to the friction disks, a link connecting the ends of the said levers, a rod connected at one end to one of the said levers, a thumb screw making threaded engagement with the rod, and means for operatively connecting the interchangeable rollers and intermediate roller with the friction disks.

In witness whereof I have hereunto set my hand in the presence of two witnesses.

ORVILLE EARNEST JOSEPH.

Witnesses:
H. JOSEPH,
L. B. JOSEPH.

Copies of this patent may be obtained for five cents each, by addressing the "Commissioner of Patents, Washington, D. C."